(12) United States Patent
Donteverde

(10) Patent No.: US 7,076,497 B2
(45) Date of Patent: Jul. 11, 2006

(54) METHOD FOR PROVIDING AND EXCHANGING SEARCH TERMS BETWEEN INTERNET SITE PROMOTERS

(75) Inventor: Monte Donteverde, Barrington Hills, IL (US)

(73) Assignee: EMERgency24, Inc., Chicago, IL (US)

( * ) Notice: Subject to any disclaimer, the term of this patent is extended or adjusted under 35 U.S.C. 154(b) by 177 days.

(21) Appl. No.: 10/065,397

(22) Filed: Oct. 11, 2002

(65) Prior Publication Data

US 2003/0061219 A1    Mar. 27, 2003

(51) Int. Cl.
*G06F 7/36* (2006.01)

(52) U.S. Cl. .......................................... 707/102; 707/3
(58) Field of Classification Search .................... 707/7, 707/2, 104.1, 102
See application file for complete search history.

(56) References Cited

U.S. PATENT DOCUMENTS

| | | | |
|---|---|---|---|
| 5,020,019 A * | 5/1991 | Ogawa ........................... | 707/5 |
| 5,297,042 A | 3/1994 | Morita | |
| 5,745,899 A * | 4/1998 | Burrows ..................... | 707/102 |
| 5,848,407 A | 12/1998 | Ishikawa et al. | |
| 5,850,433 A | 12/1998 | Rondeau | |
| 5,864,845 A | 1/1999 | Voorhees | |
| 5,911,146 A | 6/1999 | Johari et al. | |
| 5,920,854 A | 7/1999 | Kirsch et al. | |
| 5,920,859 A | 7/1999 | Li | |
| 5,970,486 A | 10/1999 | Yoshida et al. | |
| 5,987,457 A | 11/1999 | Ballard | |
| 5,991,756 A | 11/1999 | Jiong | |
| 6,006,225 A | 12/1999 | Bowman et al. | |
| 6,009,410 A | 12/1999 | LeMole et al. | |
| 6,070,157 A | 5/2000 | Jacobson et al. | |
| 6,070,158 A | 5/2000 | Kirsch et al. | |
| 6,078,866 A | 6/2000 | Buck et al. | |
| 6,148,289 A | 11/2000 | Virdy | |
| 6,169,986 B1 | 1/2001 | Bowman et al. | |
| 6,178,419 B1 * | 1/2001 | Legh-Smith et al. .......... | 707/6 |
| 6,182,065 B1 | 1/2001 | Yeomans | |
| 6,208,988 B1 | 3/2001 | Schultz | |
| 6,269,361 B1 | 7/2001 | Davis et al. | |
| 6,308,202 B1 | 10/2001 | Cohn et al. | |
| 6,321,220 B1 | 11/2001 | Dean et al. | |
| 6,321,228 B1 | 11/2001 | Crandall et al. | |
| 6,327,590 B1 | 12/2001 | Chidlovskii et al. | |
| 6,336,122 B1 | 1/2002 | Chakrabarti | |
| 6,345,273 B1 | 2/2002 | Cochran | |
| 6,356,899 B1 | 3/2002 | Chakrabarti | |
| 6,363,379 B1 | 3/2002 | Jacobson | |
| 6,370,525 B1 | 4/2002 | Kaufman | |
| 6,370,527 B1 | 4/2002 | Singhal | |

(Continued)

*Primary Examiner*—Paul L. Rodriguez
*Assistant Examiner*—Luke Osborne
(74) *Attorney, Agent, or Firm*—Seyfarth Shaw LLP

(57) ABSTRACT

A method of assigning keywords to an Internet site or page, comprising the steps of providing a topical category database, assigning at least one keyword to the predefined topical category, providing an Internet site and page database containing information relative to at least one Internet site or page, assigning each Internet site or page to at least one predefined topical category, and assigning each Internet site at least one keyword contained within the keyword list for the site assigned topical category.

7 Claims, 3 Drawing Sheets

U.S. PATENT DOCUMENTS

| | | |
|---|---|---|
| 6,377,961 B1 | 4/2002 | Ryu |
| 6,397,211 B1 | 5/2002 | Cooper |
| 6,397,212 B1 | 5/2002 | Biffar |
| 6,434,548 B1 | 8/2002 | Emens et al. |
| 6,496,818 B1 * | 12/2002 | Ponte .......................... 707/2 |
| 6,647,383 B1 | 11/2003 | August |
| 6,678,694 B1 | 1/2004 | Zimmermann |
| 6,701,314 B1 * | 3/2004 | Conover et al. ............... 707/7 |
| 6,704,729 B1 | 3/2004 | Klein |
| 2002/0023085 A1 | 2/2002 | Keith |
| 2002/0099700 A1 | 7/2002 | Li |
| 2003/0004781 A1 | 1/2003 | Mallon |
| 2003/0037050 A1 | 2/2003 | Monteverde |
| 2003/0088553 A1 | 5/2003 | Monteverde |

\* cited by examiner

METHOD FOR PROVIDING AND EXCHANGING SEARCH TERMS BETWEEN INTERNET SITE PROMOTERS

BACKGROUND OF THE INVENTION

The present invention is related to a process of keyword generation for Internet sites and Internet pages. More particularly, the present invention relates to methodologically assigning keywords for promoting Internet sites and Internet pages through a conventional search engine by accessing a data pool of applicable keywords based upon the Internet site's or page's content and topical category assignment.

An Internet site typically contains a plurality of pages that makes up that particular Internet site. Each individual Internet page contained within that Internet site may contain content, while still relevant to the main Internet site, may be somewhat different. As such, it is typical that individual Internet pages, as well as an Internet site, contain keywords describing the Internet sites and pages' content.

A keyword typically consists of a significant word or a string of words from a title or content of a document in order to index its contents for easy and quick searching and subsequent access. Keywords have proven to be invaluable to the Internet due to the vast amount of available documents contained therein. Keywords allow an Internet user to search through literally millions of documents based upon a single word or phrase which is relevant to the user's required documents. As such, only those documents and Internet sites pertaining to the desired keyword are returned. Without the ability of keyword searching, the Internet would essentially be useless because the required information would not be easily located.

As such, Internet users searching for products, services, or information typically use a keyword based Internet search engine, such as YAHOO!, GOOGLE, EXCITE, and the like to find Internet sites and pages. The user starts their search by entering a search query containing at least one expected keyword inside the search engine input box, which the search engine then uses to search its database and generate a return list of relevant Internet sites and pages.

As to be expected, the higher on the result list for a particular keyword, the more likely the Internet site or page will be visited by an Internet user, especially when the result lists can contain hundreds of thousands of relevant Internet sites and pages. As such, it is essential for a successful Internet site or page to be listed as high in the result list as possible. It is thus imperative that correct and accurate keywords are assigned for a particular Internet site or page, otherwise its value would be greatly underappreciated by not being returned in by an appropriate keyword search.

Typically, Internet site promoters or designers determine what keywords are assigned to their Internet site, and its subsequent pages, based upon their own subjective determination of what keywords are relevant to the content of the Internet site and its underlying Internet pages. The Internet site promoter typically utilizes one of many different subjective relevancy techniques to determine which keywords should be associated with the specific Internet site and its pages. This is typically accomplished by relating the Internet site's and page's content to the definitional meaning or typical linguistic usage of the keyword. Once that is determined and after the Internet site promoter submits his Internet site information and designated keywords, the search engine provider determines which Internet site or page is the most relevant for that particular queried keyword term and lists that Internet site or page first in the results list and the rest of the keyword matched Internet sites and pages in order of their respective relevancy. A limitation of this process is that there is vast inconsistency between like Internet sites and pages and the keywords which were assigned by the Internet site promoters due to subjective preferences of the Internet site promoters. The present invention overcomes this limitation by, for example, methodologically recommending and assigning appropriate keywords contained within respective topical category keyword pools to Internet sites and pages based upon the Internet site's or page's content and subsequent assignment to a topical database, thus negating the need for Internet site promoter subjective keyword determination.

Free Internet site and page listings are utilized by Internet site promoters trying to attract Internet users to their site without spending any money. An Internet site promoter typically submits his Internet site's or page's content information, in the form of keywords, to a public search engine provider, which will in turn index that Internet site or pages in their database based upon the designated keywords. The Internet search engine provider may also randomly search the Internet on its own and index located Internet sites and pages to ensure an accurate and current indexing. As such, whenever an Internet search user inputs a designated keyword associated with that Internet site or page, the Internet site or page will be listed in the return list due to its placement in the search provider's indexing system.

One of the techniques the search engine provider typically employs to determine an Internet site's or page's relevancy ranking for a particular keyword is to search the Internet site's or page's source code. Particularly, the source code with the most pertinent relevancy information is the meta tag source code contained within the header of the Internet site home page, and subsequently invisible to the ordinary user, of any given Internet site. Meta tags typically contain content information about the Internet site, usually consisting of a description of the Internet site and expected keywords that describe the contents of the Internet. For example, an Internet site about tax law would likely have the following meta tag information within its Internet site home page to describe the content about the Internet site: <meta name="description" content=A website about tax law and information about avoiding the "taxman">. The Internet site would also probably have another meta tag that includes the following information which lists the expected keywords for that Internet site: <meta name="keywords" content="tax, law, tax law, tax man, taxes, IRS, red flags, audit, audits, tax audit">. In this example, if an Internet search user entered any of the keywords tax, law, tax law, tax man, taxes, IRS, red flags, audit, audits, tax audit, this Internet site would be returned in the results list. Based upon the number of times a certain keyword is used throughout the Internet site's meta tags, the higher the relevancy the search provider will afford the Internet site and thus the Internet site will appear higher on a result list for that particular keyword search.

In the area of paid Internet site listings, or typically referred to as "Pay-Per-Click" search engines, Internet site promoters pay for relevancy placing by submitting monetary amounts for certain keywords or keyword phrases to the Internet search engine provider. As such, the higher the monetary amount, the greater the chance of being awarded higher relevancy for specific keywords, thus being listed higher in the return list and subsequently having a greater chance of attracting Internet users.

The search engine provider typically reviews these submissions and determines if the keywords submitted by the Internet site promoter are actually relevant to the Internet site's content in order to maintain the search engine's integrity. If the keywords are relevant, the Internet site's uniform resource locator ("URL") information is placed on active status in the search engine provider's database. Each URL is then matched to the submitted keywords of the Internet site. The selection and subsequent assignment to the URL of appropriate keywords is the key to successful promoting and for receiving more Internet users to the Internet site.

The present invention overcomes the disadvantages and/or shortcomings of known prior art keyword assignment processes and provides significant thereover.

BRIEF SUMMARY OF THE INVENTION

It is therefore an object of the present invention to provide a system and method for methodologically assigning keywords to Internet sites and pages.

It is a further object of the present invention to offer Internet site promoters the option of using a reciprocal keyword exchange program that will reduce the time and effort associated with generating appropriate keywords.

Another object of the present invention is to assign each Internet site and page to an appropriate topical category and associate relevant keywords to each topical category.

Yet another object of the present invention to have each new keyword submission by an Internet site promoter in the reciprocal keyword exchange program become public domain and available for all other Internet site promoters within the same specified topical category to view and use.

The present invention is a unique and novel method for providing and exchanging keywords between Internet site promoters engaged in the optimization and promotion of their Internet site and its pages through the use of conventional computer network search engines.

The present invention provides a method for assigning relevant keywords for those seeking to promote their Internet sites and pages through the use of conventional Internet search engines. The present invention enhances the Internet optimization experience for Internet site promoters by providing a method for Internet site promoters to receive and exchange keywords with other Internet site promoters within their same relevant topical category.

The present invention allows Internet site promoters to utilize a system whereby the Internet site promoter's Internet site, and its subsequent pages, are assigned into a specific topical category with similarly related Internet sites and pages and trades its assigned keywords in an exchanging manner with other Internet site promoters within the same specified topical category, referred to as the reciprocal exchange program. Once the Internet site promoter enters the reciprocal exchange program, each new keyword submission becomes knowledgeable to all other Internet site promoters within that specific topical category whereupon the submitted keywords are uninhibited for other Internet site promoters in the program to view and use for their own similarly situated Internet site and pages, thus ensuring consistency of keyword assignment between all related Internet sites and pages contained within the same topical category.

In the preferred embodiment of the present invention, Internet sites and pages are assigned to at least one topical category based upon the relevancy and relatedness of the Internet site's content to the topical categories description. It is important to note that, to ensure consistency and accuracy, an Internet site may be assigned to at least one topical category and each individual underlying Internet page of that Internet site may be assigned to different topical categories based upon their respective content. Internet site promoters then view and select typical keywords deemed generally acceptable and used by other Internet site promoters within the same topical category. Assignment of the Internet site and pages to a topical category is done by either a suggestion by the Internet site promoter, whereupon such a suggestion is reviewed by the service provider, or by assignment by the service provider into a specified topical category based on a set of relevancy criteria.

BRIEF DESCRIPTION OF THE SEVERAL VIEWS OF THE DRAWINGS

The preferred embodiment is herein described in detail with references to the drawings, where appropriate, wherein.

DETAILED DESCRIPTION OF THE INVENTION

The preferred embodiment of the present invention utilizes a method of assigning keywords, Internet sites and Internet pages to pre-defined topical categories in order to accurately and reliably provide Internet site promoters with relevant keywords that will assist them in promoting their Internet sites and pages.

The preferred embodiment of the present invention provides a topical category database containing at least one predefined topical category. Each predefined topical category preferably has at least a title and a brief synopsis description, somewhat similar to encyclopedic topics. Alternately, the predefined topical categories can be defined with other cataloging references, such as a numeric cataloging system, computer cataloging system, and the like.

Each topical category preferably has at least one related or relevant keyword assigned to that category based upon their respective definitions and/or common language usages, thus creating a keyword list for each topical category.

The preferred embodiment of the present invention also provides a database of Internet sites and Internet pages with information for at least one Internet site or Internet page. Preferably, the Internet site and Internet page database contains information relative to a respective Internet site and Internet page, such as topic, title, content, author, description, and location. Also, each Internet site and Internet page contained within the Internet site and Internet page database is preferably assigned to at least one predefined topical category, thus creating an assigned topical category.

Figure 1:
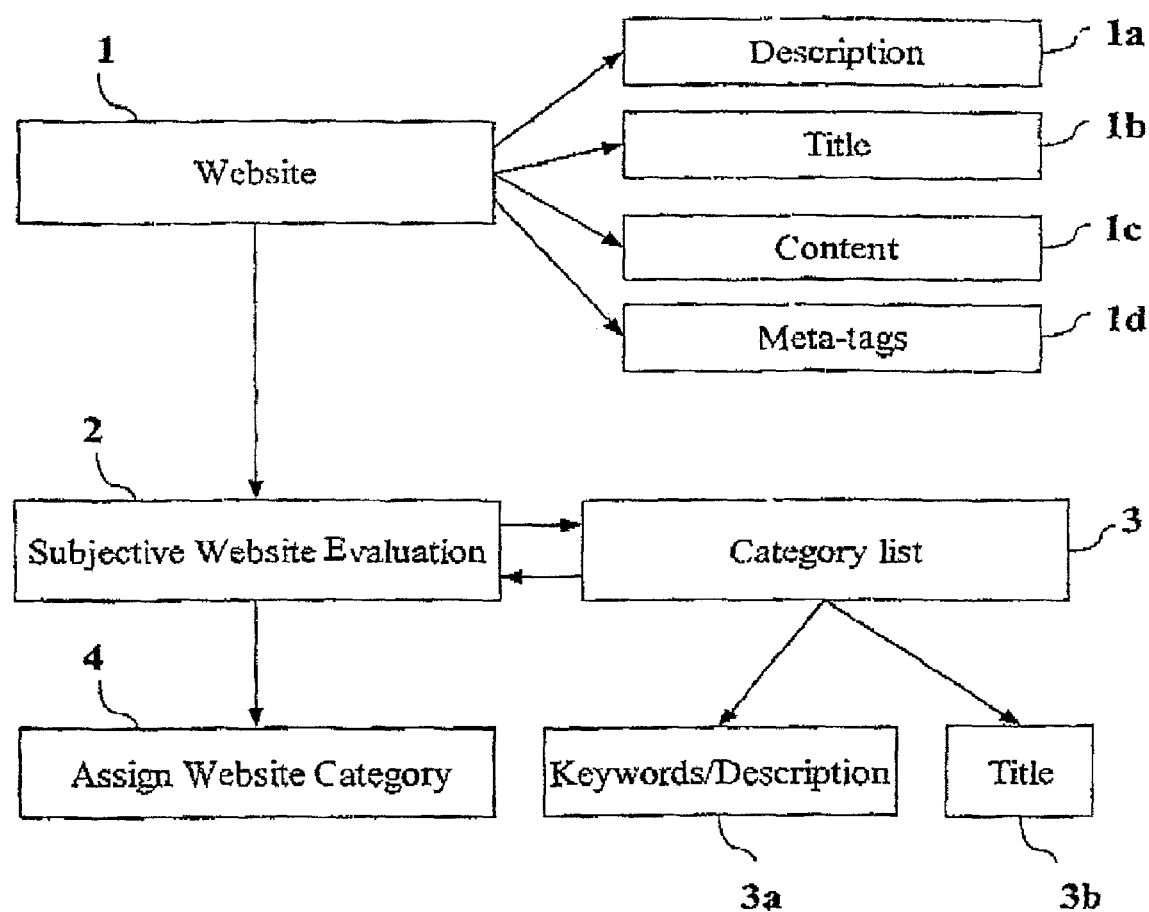
FIG. 1 is a flowchart depicting the process within the preferred embodiment of the present invention of assigning an Internet site to a topical category and subsequent keywords.

In the preferred embodiment of the present invention, each Internet site is assigned to at least one topical category, wherein each Internet page contained within that respective Internet site is independently assigned to at least one topical category, irrespective of the Internet site topical category assignment. The Internet site and the respective Internet page topical category assignments may be different, depending upon their relevancy to the respectively assigned topical category. Alternately, only the Internet site is assigned to at least one topical category. Referring to FIG. 1, the preferred embodiment of the present invention utilizes a subjective determination of systematically assigning an Internet site or Internet page 1 contained within the present invention's Internet site and Internet page database to at least one pre-defined topical category in the topical category database utilizing a preferred method where an Internet site or Internet page 1 is dissected into 4 subparts; a description 1a, a title 1b, content 1c, and meta-tags 1d. The sub-parts are used by the search service provider to evaluate the Internet site or Internet page 2 and compare the components of the Internet site or Internet page to the topical category list 3 contained within the topical category database to assign each Internet site and Internet page to the most relevant and appropriate topical category 4. Alternately, the present invention can categorize an Internet site or Internet page 1 utilizing any combination of the Internet site's or Internet page's 1 description 1a, title 1b, content 1c, or meta-tags 1d. Still alternately, an Internet site or Internet page can be assigned to a category by using any sub-part exclusively. Each Internet site and Internet page is preferably assigned to one most relevant category. Alternately, each Internet site and Internet page can be assigned to a plurality of categories.

In an alternate embodiment of the present invention, each respective Internet site and Internet page is automatically assigned to an appropriate topical category by reviewing the previously assigned keywords contained within the meta tag field of the Internet site or Internet page. As such, when there is a match between a plurality of previously assigned keywords contained within the meta tag field of the Internet site or Internet page and the keyword list of a predefined topical category, then the Internet site or Internet page is automatically assigned to that respective category.

Figure 2:
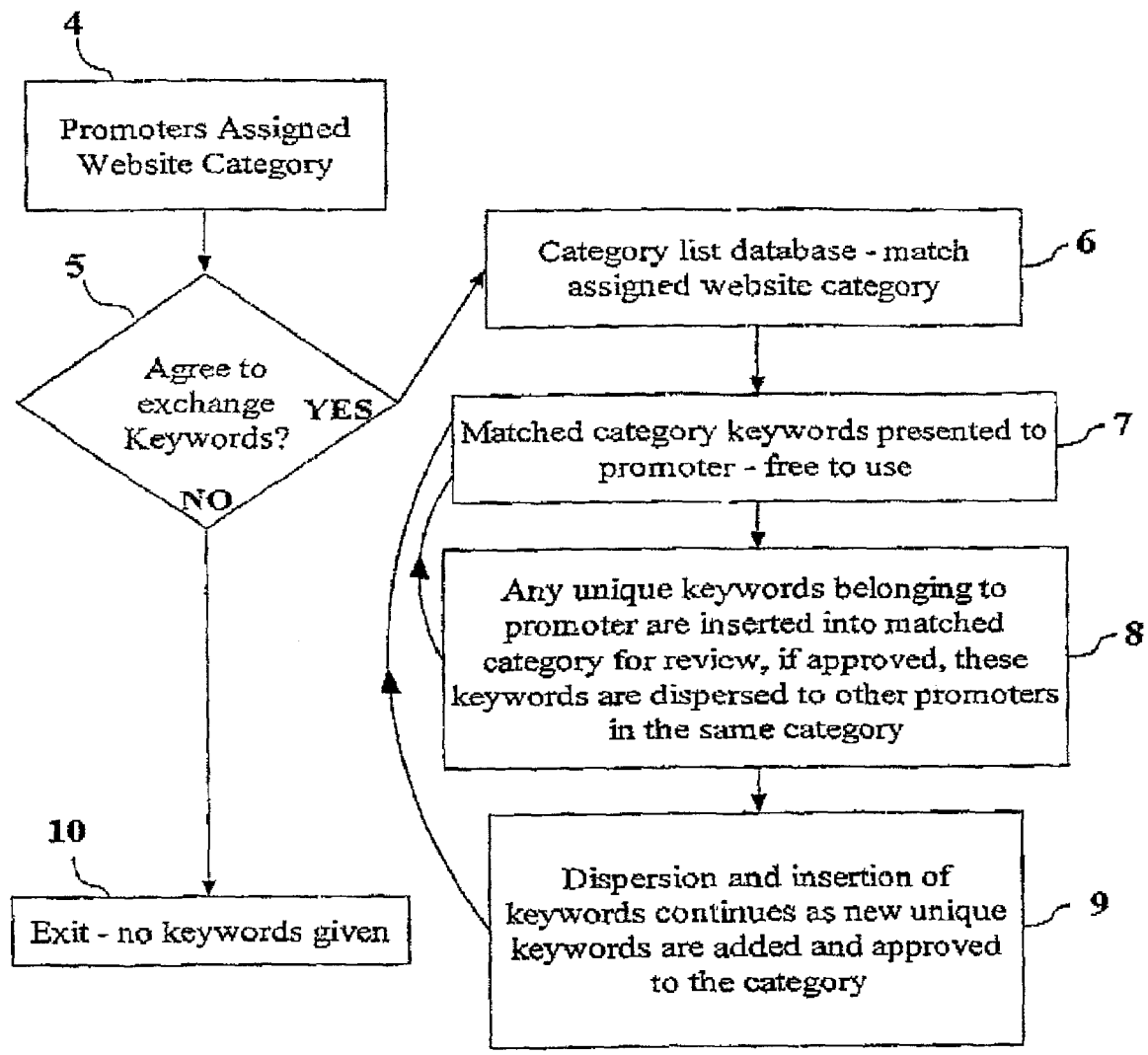
FIG. 2 is a flowchart outlining the process of the preferred embodiment of the present invention.

Referring to FIG. 2, the preferred embodiment of the present invention allows either the Internet site promoter to suggest which predefined topical category their Internet site, and its subsequent Internet pages, should be assigned to or is assigned to a predefined topical category by the service provider 4. Once the Internet site and its Internet pages are assigned to a predefined topical category, the service provider will preferably disclose to the Internet site promoter the quantity of keywords in the keyword list of the assigned topical category. If the Internet site promoter decides to utilize the method of the present invention, the Internet site promoter then has access to the topical category database 6 listing where the Internet site or Internet page is assigned. The Internet site promoter is then provided the keyword list of the assigned topical category 7. The Internet site promoter can begin selecting the keywords contained within the keyword list to assist in promoting their Internet site or Internet page based upon their own subjective determination. Alternately, the service provider can assign keywords from the keyword list to the Internet site or Internet page without the Internet site promoter's input. It is at this point that the preferred embodiment of the present invention recommends and assigns relevant keywords to the Internet site promoter's Internet site or Internet page to ensure consistency and reliability of the Internet search service.

In the preferred embodiment of the present invention, if the Internet site promoter already has proposed keywords that are unique and are not already found in the keyword list 8, those proposed keywords may be submitted to the service provider and will thus be added to the keyword list for the assigned topical category for other users. As such, the preferred embodiment of the present invention maintains a keyword list for each predefined topical category that are dynamic rather than static. Alternately, the Internet site promoter must exclusively utilize keywords recommended by the service provider and cannot submit their own recommendations. Still alternately, an Internet site promoter may be required to submit proposed keywords to the service provider to be added to the keyword list in order to ensure the keyword database's constant evolution.

Figure 3:
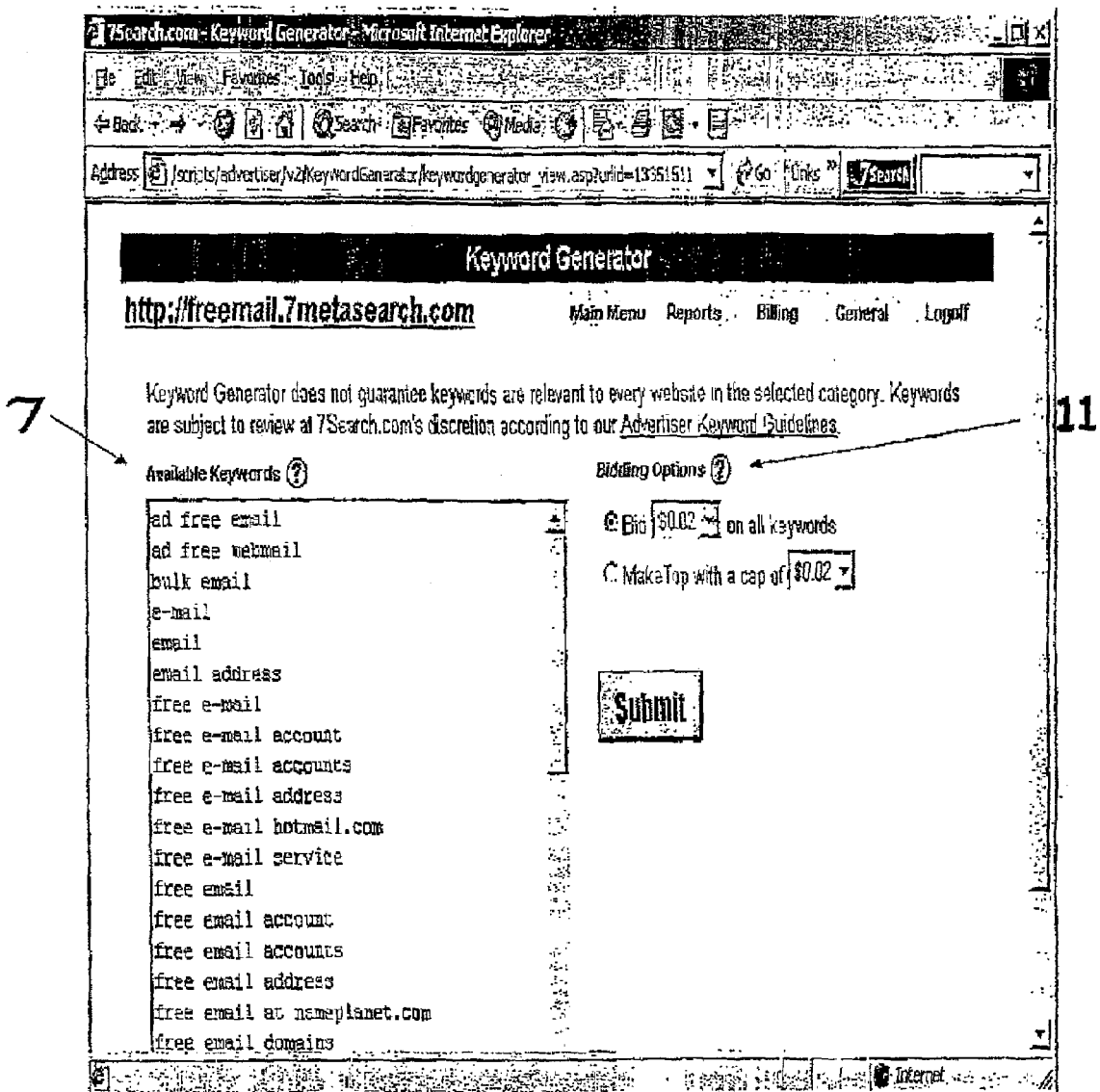
FIG. 3 is an example of an Internet site promoter's keyword account according to a preferred embodiment of this invention.

The present invention can be better illustrated with the following example, which is intended to explain, and not limit, the invention. Referring to FIG. 3, an example embodiment of the present invention reflecting the use of the present invention in an online Pay-Per-Click search engine setting. The Internet site promoter bids on keywords 11 in order to promote his or her Internet site, and can do so by selecting keywords from the keyword list assigned for the given category 7.

While preferred and alternate embodiments have been described herein, it is to be understood that these descriptions are only illustrative and are thus exemplifications of the present invention and shall not be construed as limiting. It is to be expected that others will contemplate differences, which, while different from the foregoing description, do not depart from the true spirit and scope of the present invention herein described and claimed.

What is claimed is:

1. A method of assigning keywords to an Internet site or Internet page, comprising the steps of:
   providing a topical category database, wherein said topical category database contains at least one predefined topical category;
   assigning at least one keyword to said predefined topical category, thereby creating a keyword list for said predefined topical categories;
   providing an Internet site and Internet page database, wherein said Internet site and Internet page database contains information relative to at least one Internet site or Internet page and is assembled without the use of keywords from the keyword list;
   assigning each said Internet site to at least one said predefined topical category, thereby creating a site assigned topical category; and
   assigning each said Internet site at least one keyword contained within said keyword list for said site assigned topical category.

2. A method as claimed in claim 1 further comprising the step of assigning each said Internet page at least one keyword contained within said keyword list for said page assigned topical category.

3. A method as claimed in claim 1 wherein each of said predefined topical categories has a title and a brief synopsis description.

4. A method as claimed in claim 1 wherein the step of assigning at least one keyword to said predefined topical category comprises assigning at least one keyword to said predefined topical category based on relatedness between said keyword and said predefined topical category.

5. A method as claimed in claim 1 further comprising the step of adding any keywords previously assigned to said Internet site to said keyword list for said site assigned topical category.

6. A method as claimed in claim 1 wherein the step of assigning each said Internet site to at least one said predefined topical category, thereby creating a site assigned topical category, comprises the steps of:
   reviewing any previously assigned keywords contained within the meta-tag field of said Internet site;

matching said previously assigned keywords to keywords contained within said keyword list; and assigning said Internet site to the predefined topical category whose keyword list contains matching keywords.

7. A method of assigning keywords to an Internet site or Internet page, comprising the steps of:

providing a topical category database, wherein said topical category database contains at least one predefined topical category;

assigning at least one keyword to said predefined topical category, thereby creating a keyword list for said predefined topical categories;

providing an Internet site and Internet page database, wherein said Internet site and Internet page database contains information relative to at least one Internet site or Internet page and is assembled without use of keywords from the keyword list;

assigning each said Internet site to at least one said predefined topical category, thereby creating a site assigned topical category;

assigning each said Internet site at least one keyword contained within said keyword list for said site assigned topical category; and permitting keyword searching for an Internet site or Internet page having information relative to such Internet site or Internet page within the Internet site and Internet page database based on the at least one keyword assigned to each Internet site.

* * * * *

UNITED STATES PATENT AND TRADEMARK OFFICE
CERTIFICATE OF CORRECTION

| | |
|---|---|
| PATENT NO. | : 7,076,497 B2 |
| APPLICATION NO. | : 10/065397 |
| DATED | : July 11, 2006 |
| INVENTOR(S) | : Monteverde |

Page 1 of 1

It is certified that error appears in the above-identified patent and that said Letters Patent is hereby corrected as shown below:

On the title page, please change the name of the Inventor from "Monte Donteverde" to -- Dante Monteverde. --.

Signed and Sealed this

Nineteenth Day of September, 2006

JON W. DUDAS
*Director of the United States Patent and Trademark Office*